(12) United States Patent
Festejo

(10) Patent No.: US 7,714,220 B2
(45) Date of Patent: May 11, 2010

(54) METHOD AND APPARATUS FOR SELF-INSTRUCTION

(75) Inventor: Ronald Festejo, London (GB)

(73) Assignees: Sony Computer Entertainment America Inc., Foster City, CA (US); Sony Computer Entertainment Europe, London (GB)

(*) Notice: Subject to any disclaimer, the term of this patent is extended or adjusted under 35 U.S.C. 154(b) by 43 days.

(21) Appl. No.: 12/142,498

(22) Filed: Jun. 19, 2008

(65) Prior Publication Data

US 2009/0064849 A1    Mar. 12, 2009

(51) Int. Cl.
*G09B 15/06* (2006.01)
*G10G 1/02* (2006.01)

(52) U.S. Cl. ............... 84/485 R; 84/470 R; 84/477 R; 84/723

(58) Field of Classification Search ............. None
See application file for complete search history.

(56) References Cited

U.S. PATENT DOCUMENTS

| | | | | |
|---|---|---|---|---|
| 5,777,251 A | * | 7/1998 | Hotta et al. ............. | 84/609 |
| 6,093,879 A | * | 7/2000 | Pye .................... | 84/451 |
| 6,162,981 A | * | 12/2000 | Newcomer et al. ...... | 84/485 R |
| 6,753,466 B1 | * | 6/2004 | Lee .................... | 84/669 |
| 6,846,980 B2 | * | 1/2005 | Okulov ................. | 84/646 |
| 7,112,738 B2 | * | 9/2006 | Hyakutake et al. ....... | 84/737 |
| 7,446,253 B2 | * | 11/2008 | Knapp et al. ........... | 84/722 |
| 7,521,619 B2 | * | 4/2009 | Salter ................. | 84/477 R |
| 7,563,974 B2 | * | 7/2009 | Ozaki et al. ........... | 84/615 |
| 2004/0139847 A1 | * | 7/2004 | Aiba .................. | 84/722 |
| 2005/0183567 A1 | * | 8/2005 | Aoki et al. ............ | 84/722 |
| 2008/0271594 A1 | * | 11/2008 | Starr ................. | 84/646 |

* cited by examiner

*Primary Examiner*—Marlon T Fletcher
(74) *Attorney, Agent, or Firm*—Frommer Lawrence & Haug LLP; William S. Frommer; Thomas F. Presson

(57) ABSTRACT

A method for self-instruction of a user's hands on an object such as a musical instrument or sports equipment. The method includes accessing finger placement data corresponding to a sequence of predetermined finger placements on a plurality of objects. A position for each finger is sensed on one or more object representations. A finger placement indication is provided on the one or more object representations. The finger placement indication corresponds to each finger of the based on the finger placement data. Each finger placement indication location is compared with an associated sensed position for each finger and a determination is made whether the finger placement indication matches the sensed position for each finger.

11 Claims, 9 Drawing Sheets

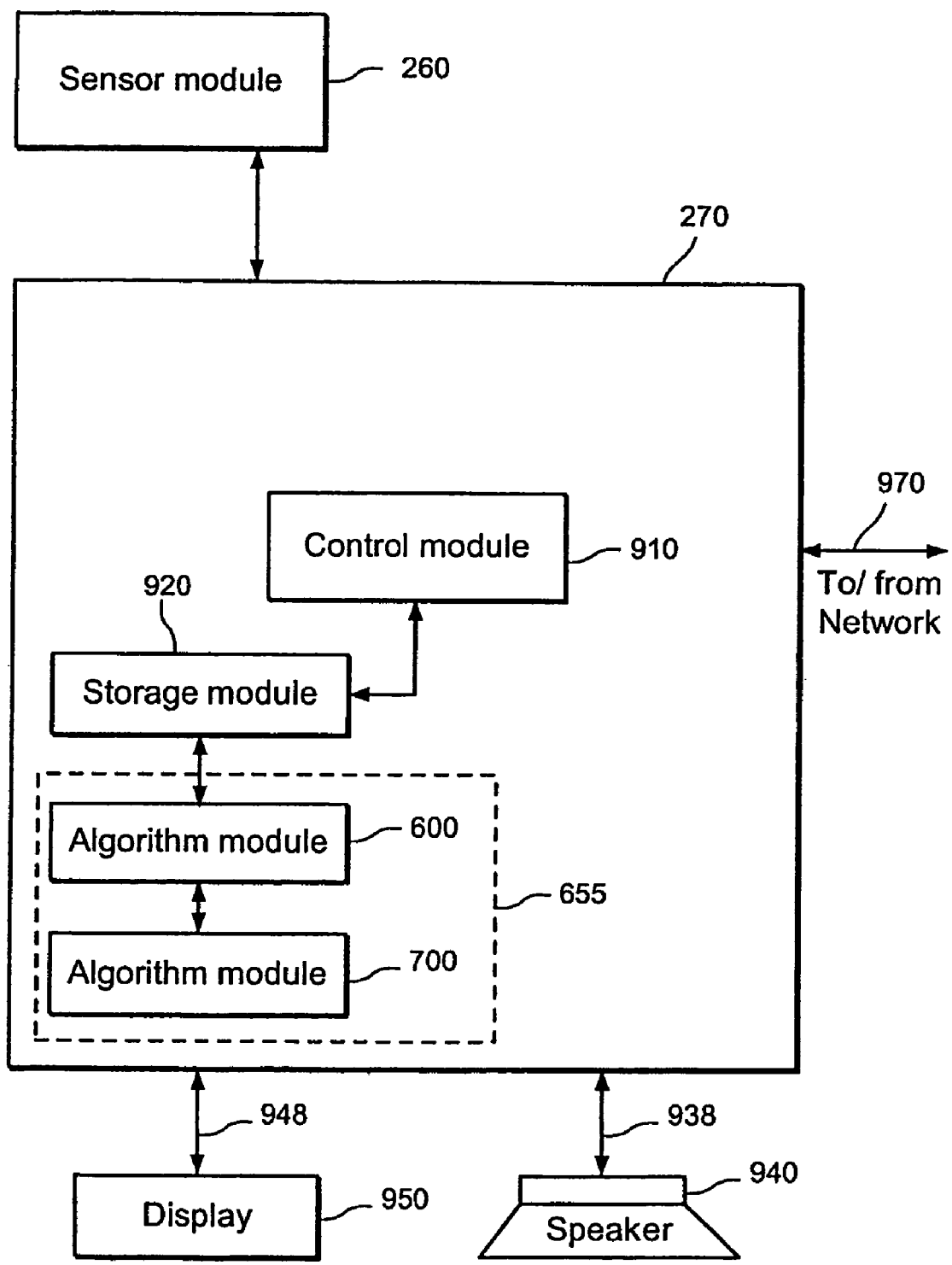
F I G. 9

METHOD AND APPARATUS FOR SELF-INSTRUCTION

BACKGROUND

1. Field of the Invention

This invention relates generally to a method and apparatus for self instruction. More specifically, the present invention is directed to directing a user's hand to the proper position of an object and to provide correction of erroneous placement of a user's hand.

2. Background Discussion

Learning an activity, such as a musical instrument or sport, such as golf or tennis, can be a time consuming process that typically involves hiring an experienced professional to explain and teach the proper hand positioning on the object (musical instrument, tennis racquet, golf club etc.). A person who wishes to learn usually takes some type of lesson, such as a small group or private lesson. Many potential students cannot afford the costs of such lessons nor have a scheduling conflict that prevents them from learning the activity.

Even if it is possible to attend lessons and pay for these lessons, every hour of lesson is usually reinforced by several hours of practice time outside of the presence of the instructor. During this practice time, it would be desirable for the instrument to automate the training process to provide instruction/correction while the student is practicing the activity.

Thus, it would be an advancement in the state of the art to facilitate students of an activity, such as learning to play a musical instrument or learning a new sport, to reach their goal by providing a self-instructional tool that provides feedback for the correct hand positioning.

SUMMARY

Accordingly, the present invention is directed to a method and apparatus for self instruction. This may apply to a sport (tennis, golf, hockey, badminton), musical instrument (guitar, flute, saxophone, trumpet, trombone), or other activity in which hand placement or motion can be directed.

One embodiment of the present invention is directed to a method for self-instruction of a user's hands on an object such as a musical instrument or sports equipment. The method includes accessing finger placement data corresponding to a sequence of predetermined finger placements on a plurality of objects. A position for each finger is sensed on one or more object representations. A finger placement indication is provided on the one or more object representations. The finger placement indication corresponds to each finger of the user based on the finger placement data. Each finger placement indication location is compared with an associated sensed position for each finger and a determination is made whether the finger placement indication matches the sensed position for each finger.

Another embodiment of the present invention is directed to providing illumination indicators of the correct hand positioning. This includes generating an illumination indication corresponding to the finger placement indication and displaying the illumination indication.

Yet another embodiment of the present invention is directed to providing audible indicators of the correct hand positioning. This includes generating an audible indication corresponding to the sensed finger position and outputting the audible indication, via a speaker, sound card or other audible output device.

Yet another embodiment of the present invention is directed to the method described above and also includes generating a representation of the finger placement data and displaying the representation of the finger placement data on a display unit.

Yet another embodiment of the present invention is directed to the method described above and also includes generating a representation of the sensed finger position and displaying the representation of the sensed finger position on the display unit.

Yet another embodiment of the present invention is directed to the method described above wherein the objects include strings.

Yet another embodiment of the present invention is directed to a method for self-instruction for strumming strings of an instrument, such as a guitar. This method includes accessing strumming placement data corresponding to a pattern of predetermined strumming on a plurality of strings. The strumming pattern for a user is sensed as a user strums one or more string representations. A strumming indication that corresponds to the strumming placement data is provided. A comparison is made between the strumming indication and an associated sensed strumming pattern and a determination is made whether the strumming indication matches the sensed strumming pattern.

Yet another embodiment of the present invention is directed to a method that combines finger placement and strumming. This method includes accessing finger placement data corresponding to a sequence of predetermined finger placements on a plurality of strings. Strumming placement data is accessed that corresponds to a pattern of predetermined strumming on a plurality of strings. A position for each finger is sensed on one or more string representations. A finger placement indication is provided on the one or more string representations. The finger placement indication corresponds to each finger, based on the finger placement data. A user strumming pattern is sensed as a user strums one or more second string representations. A strumming indication is provided that corresponds to the strumming placement data. A comparison of the strumming indication is made with an associated sensed strumming pattern. A determination is made whether the strumming indication matches the sensed strumming pattern and a comparison is made of each finger placement indication location with an associated sensed position for each finger. A determination is made whether the finger placement indication matches the sensed position for each finger.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 9 shows a block diagram of a processing module that may be used with the present invention.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
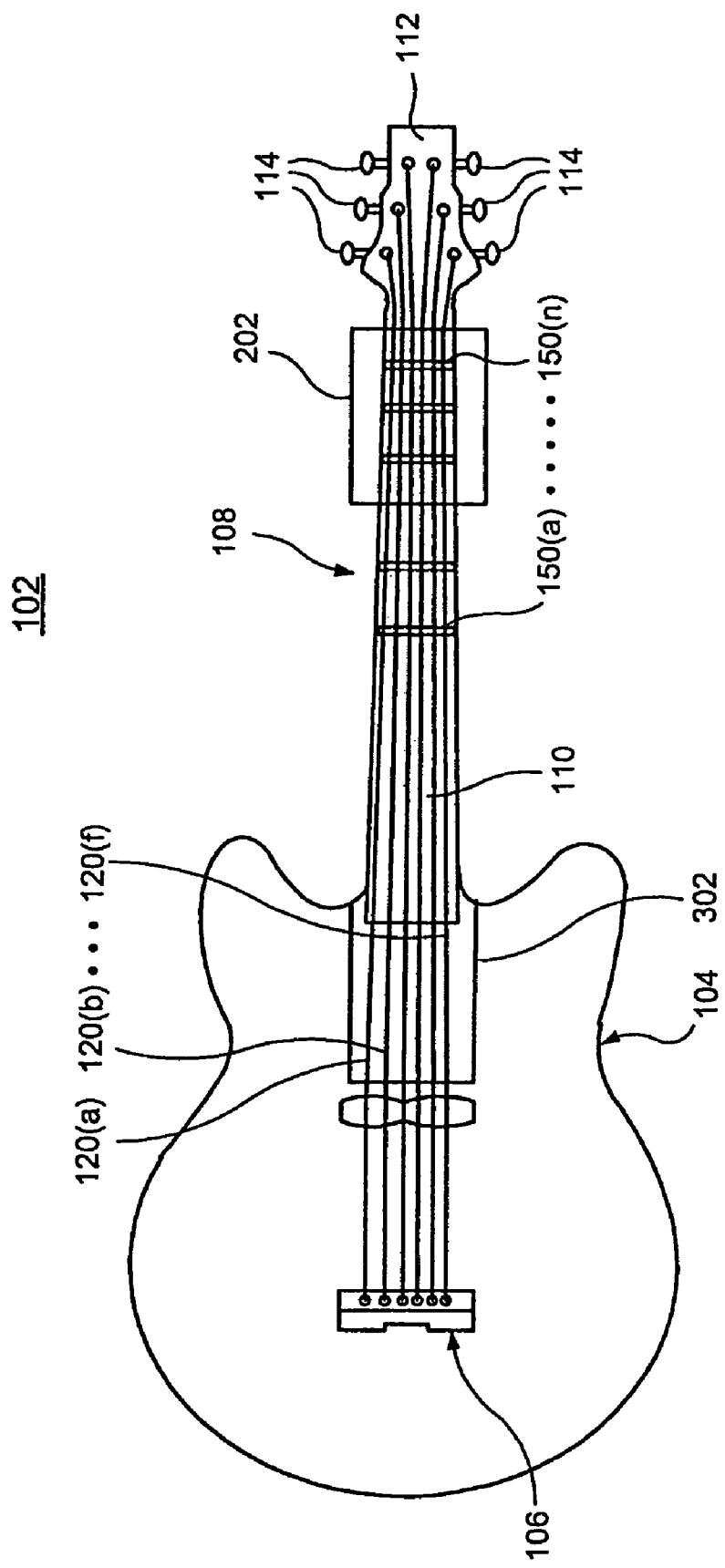
FIG. 1 illustrates a perspective view of a facsimile of a musical instrument according to the present invention.

FIG. 1 illustrates a perspective view of a musical instrument 102 according to the present invention. The instrument 102 is shown as a guitar, but may be any sports equipment or musical instrument, or object that is held in a user's hands, or operated by a user. The instrument 102 may be a facsimile of an actual guitar such as a cardboard cut-out, an inflatable guitar or other mock guitar, or alternatively an actual guitar. The guitar facsimile 102 provides support for apparatus 202 and 302 and can be held by a user to simulate an actual guitar. The guitar 102 includes a body portion 104 and a neck assembly 108. The neck assembly 108 is attached to the body portion 104 such that the neck assembly 108 extends from the body portion 104. The neck assembly 108 may include a finger board 110, a head portion 112, and tuning pegs 114. The guitar 102 also includes a plurality of string member representations 120(a) . . . (f).

While six string representations are shown in FIG. 1, it is also an embodiment that any number of strings could be used, particularly depending on the instrument. For example any other instrument may be mimicked with a facsimile thereof, such as cellos, acoustic basses, electric bass guitars and banjoes. The corresponding facsimile will simulate the actual instrument to enable a user to practice proper hand placement.

Furthermore, while a facsimile of a stringed instrument is shown, this invention also applies to other musical instruments such as flutes, trumpets, trombones, saxophones and the like. A plurality of fret representations 150(a) . . . (n) (where "n" is any suitable number) are arranged perpendicular to the string member representations 120 at predetermined locations on the fingerboard 110. When playing an actual guitar, the strings can be caused to vibrate by plucking, picking, or strumming them. The effective length of the string determines the frequency at which the string member vibrates. Changing this effective length changes the note sounded by the string. Thus, the notes created by the strings can be changed by depressing the string members at particular locations. By bringing the strings in contact with the playing surface or with the frets 150 on the playing surface, the effective length of the string is changed. In order to facilitate instruction, the user can practice proper hand positioning on the guitar facsimile 120.

The finger placement apparatus 202 and strumming apparatus 302 are also shown as being mounted on guitar 102. These are described in more detail in relation to FIGS. 2 and 3, respectively.

Figure 2:
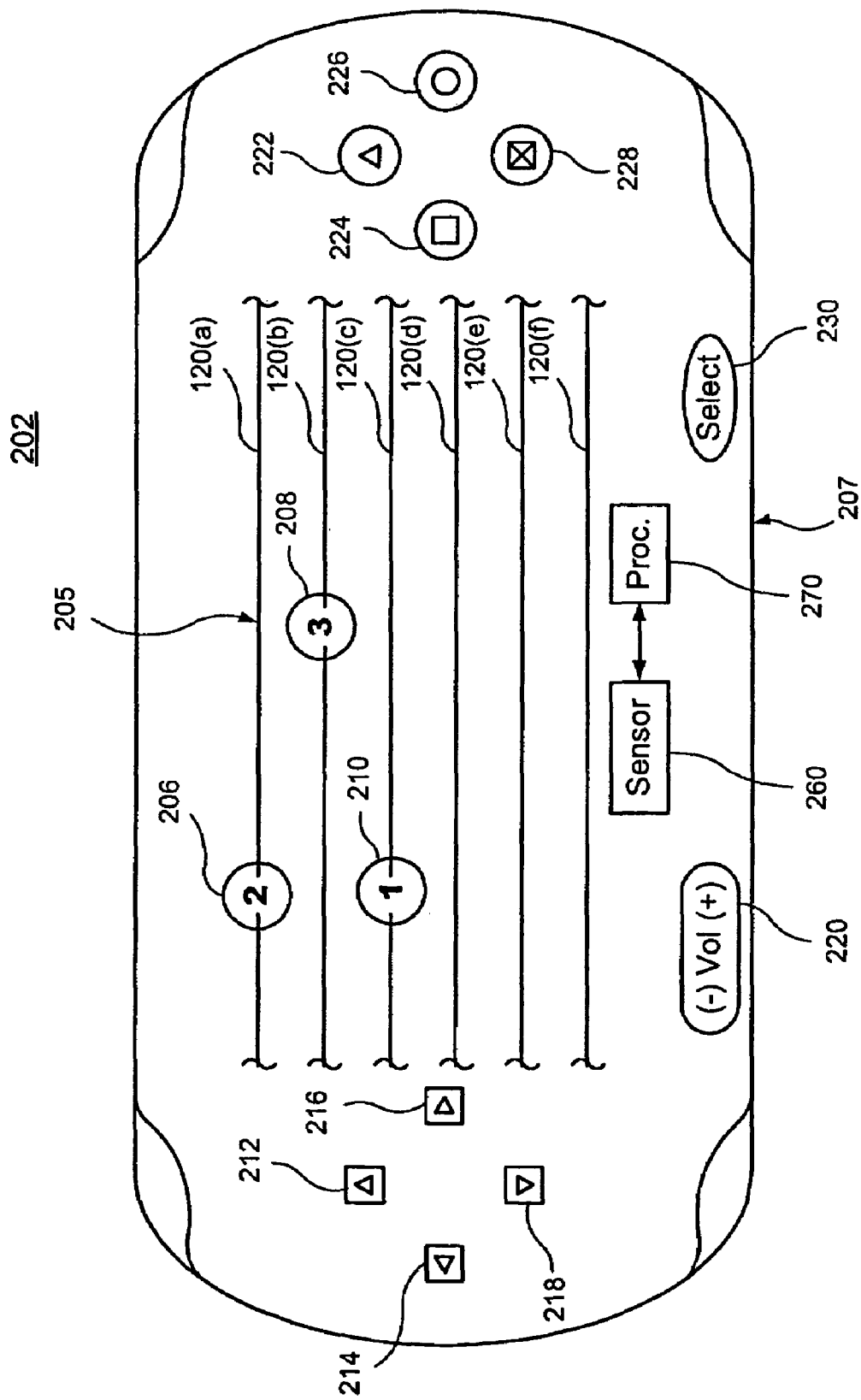
FIG. 2 illustrates a finger placement apparatus that may be used with the present invention.

FIG. 2 illustrates a finger placement apparatus 202 that may be used with the present invention. The finger placement apparatus 202 includes a touch sensitive screen, or surface, 205 and a support frame member 207.

The touch sensitive screen 205 is for example, an overlay or a pointing device that enables the user to interact with the computer by touching the screen and may be pressure-sensitive, capacitive surface or light beam. Any screen or overlay that has the ability to display and receive information on the same screen is suitable. The overlay, or touch screen 205 includes a representation of strings 120(a) . . . (f) and proper placement indicators "1" 210, "2" 206 and "3" 208. These proper placement indicators represent correct placement of a user's fingers to play a particular chord or sequence of chords. The indicators 206, 208 and 210 can be illuminated based on predetermined finger placement data, which may be stored in unit 270 provided in apparatus 202. The touch screen portion 205 can sense a user's fingers pressing on the string representations, via sensor module 260 provided in apparatus 202, and compare the sensed position to the proper location, via processor unit 270, also referred to as CPU module herein. An illumination signal can be provided by LEDs (light emitting diodes) mounted on support member 207 and visible on touch screen 205 to indicate the proper position of a user's fingers.

A determination may be made whether the actual finger placement matches the proper finger placement. This is described in more detail in relation to FIG. 4.

Furthermore, an audible signal can be generated that corresponds to the finger positions of a user, if a user were playing an actual guitar. Thus, whatever a user is playing, a corresponding signal will be produced permitting a user to hear how such playing would sound on an actual guitar.

Support frame member 207 is typically a rigid component that serves to support touch sensitive unit 205, sensor unit 260 and CPU module 270 as well volume setting 220, select module 230, control buttons 222, 224, 226 and 228 and directional controls 212, 214, 216 and 218. The support member 207 can also house a speaker (not shown) and LEDs to provide feedback to the user relative to the sensed finger positions.

Figure 3:
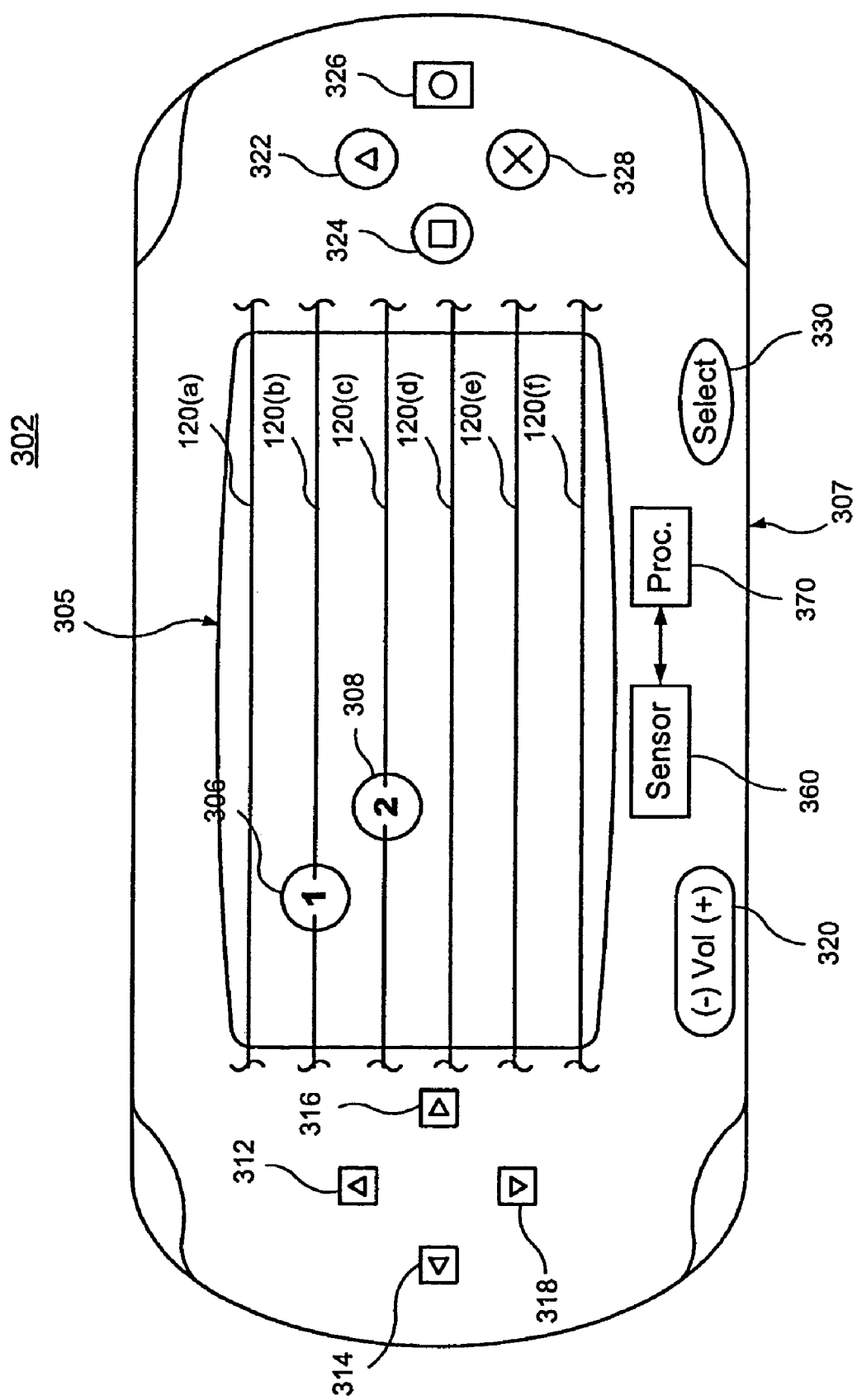
FIG. 3 illustrates a strumming apparatus that may be used with the present invention.

FIG. 3 illustrates a strumming apparatus 302 that may be used with the present invention. FIG. 3 is similar to FIG. 2 and further shows that rather than sensing finger position, apparatus 302 senses strumming data.

Thus, FIG. 3 illustrates a strumming apparatus 302 that may be used with the present invention. The strumming apparatus 302 includes a touch sensitive screen, or surface 305 and a support frame member 307.

The touch sensitive screen 305 includes a representation of strings 120(a) . . . (f) and proper placement indicators "1" 306 and "2" 308. These proper placement indicators represent correct strumming of a guitar to play a particular piece of music or song. The indicators 306, 308 can be illuminated based on predetermined strumming data, which may be stored in unit 370 in apparatus 302. The touch screen portion 305 can sense a user's fingers strumming on the string representations and compare the sensed strumming to proper strumming technique. An illumination signal can be provided by LEDs (light emitting diodes) to indicate the proper position.

A determination may be made whether the actual strumming, sensed by sensing unit 360 in apparatus 302 matches the proper strumming stored in processor module 370, also referred to as CPU module, herein. This is described in more detail in relation to FIG. 5.

Furthermore, an audible signal can be generated that corresponds to the strumming by a user, if a user were strumming an actual guitar. Thus, whatever a user is playing, a corresponding signal will be produced permitting a user to hear how such playing would sound on an actual guitar.

Support frame member 307 is typically a rigid component that serves to support touch sensitive unit 305, sensor unit 360 and CPU module 370 as well volume setting 320, select module 330, control buttons 322, 324, 326 and 328 and directional controls 312, 314, 316 and 318. The support member 307 can also house a speaker (not shown) and LEDs to provide feedback to the user relative to the sensed finger positions.

Figure 4:
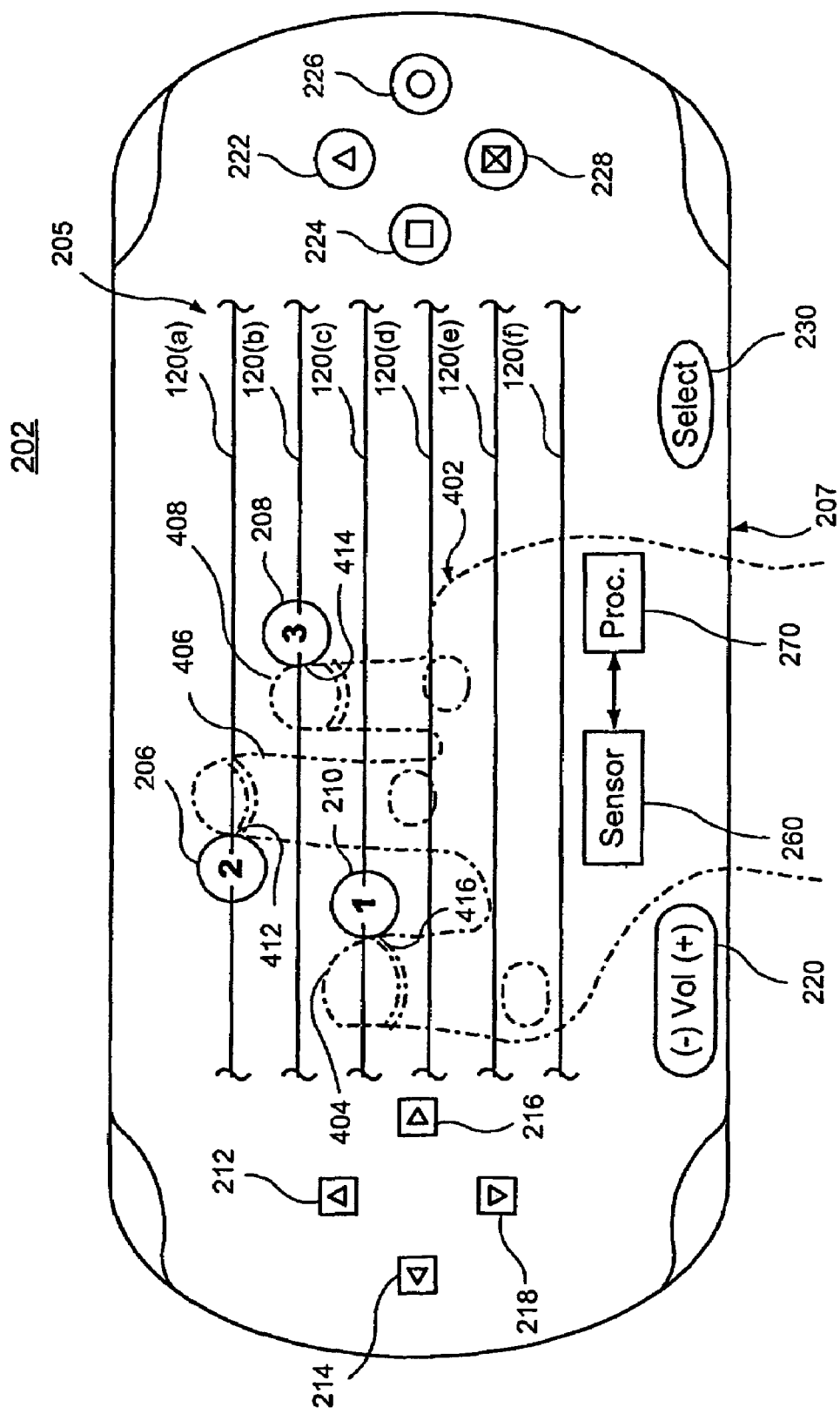
FIG. 4 shows an example of a user's hand on the finger apparatus.

FIG. 4 shows an example of a user's hand 402 on the finger placement apparatus 202. FIG. 4 is similar to FIG. 2 with the addition of a user's fingers 404, 406 and 408. The user's hand 402 with fingers 404, 406 and 408 is in contact with touch screen portion 205. As shown in FIG. 4, finger 416 is near proper position indicator "1" (210). Similarly, finger 406 is near indicator 206. The difference in the actual position of finger 406 and the proper position 206 is shown by 412. Finger 408 is slightly overlapping proper position indicator 208.

The user can adjust the position of his/her finger to be positioned in the proper location. Also, processor module 270 can calculate and store the difference quantity (412) for finger 406 or any of the other fingers of the user.

The other elements have been discussed in relation to FIG. 2 and are not further described in relation to FIG. 4.

Figure 5:
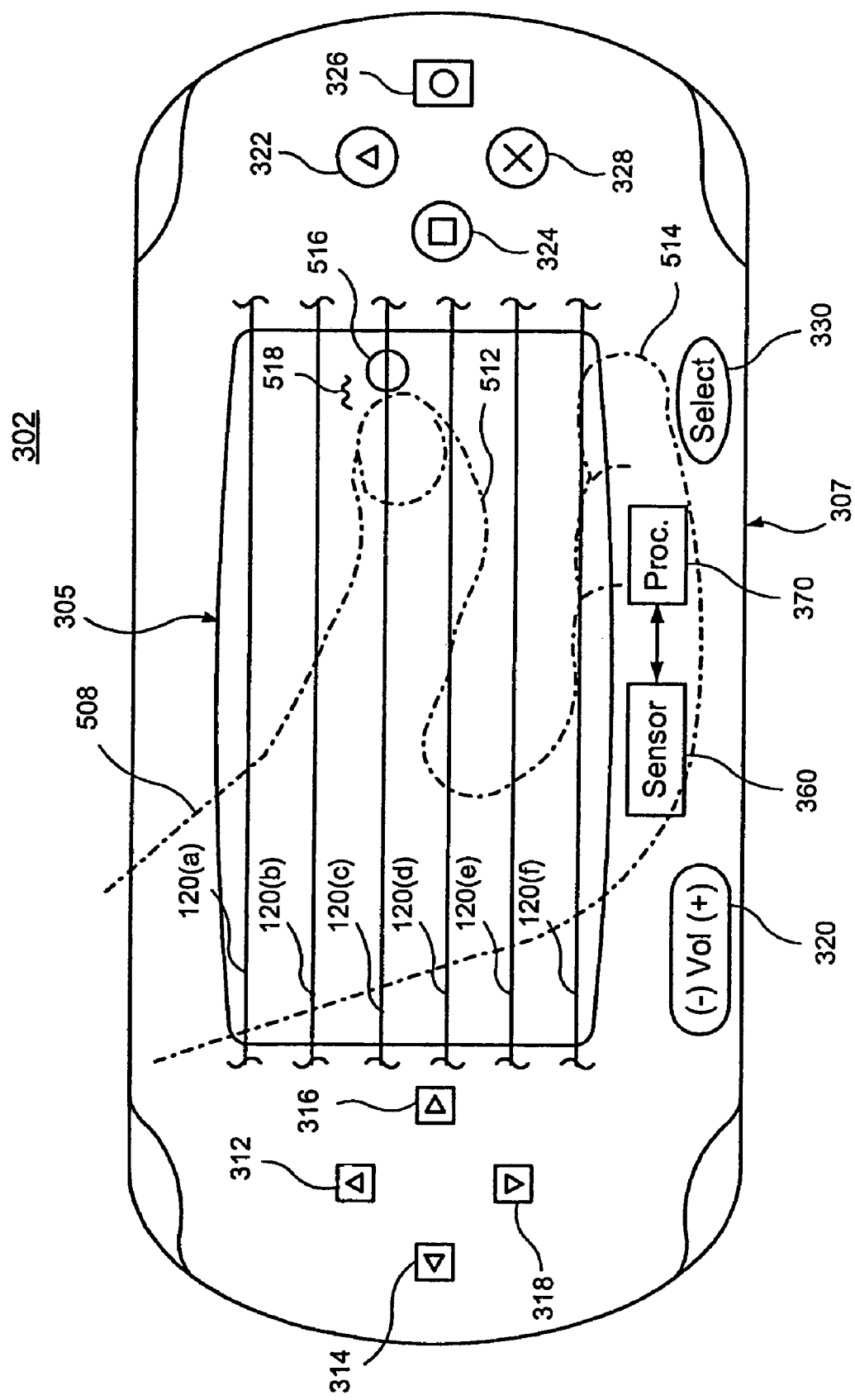
FIG. 5 shows an example of a user's hand on the strumming apparatus.

FIG. 5 shows an example of a user's hand 508 on the strumming apparatus 302. FIG. 5 is similar to FIG. 3 with the addition of a user's hand 508 having thumb 512 and fingers 514. The user's thumb 512 is in contact with touch screen portion 305. As shown in FIG. 5, thumb 512 is near proper position indicator 516.

The user can adjust the position of his/her thumb 512 to be positioned so as strum string representations 120 in the proper location. Also, processor module 370 can calculate and store the difference quantity (518).

The other elements have been discussed in relation to FIG. 3 and are not further described in relation to FIG. 5.

Figure 6:
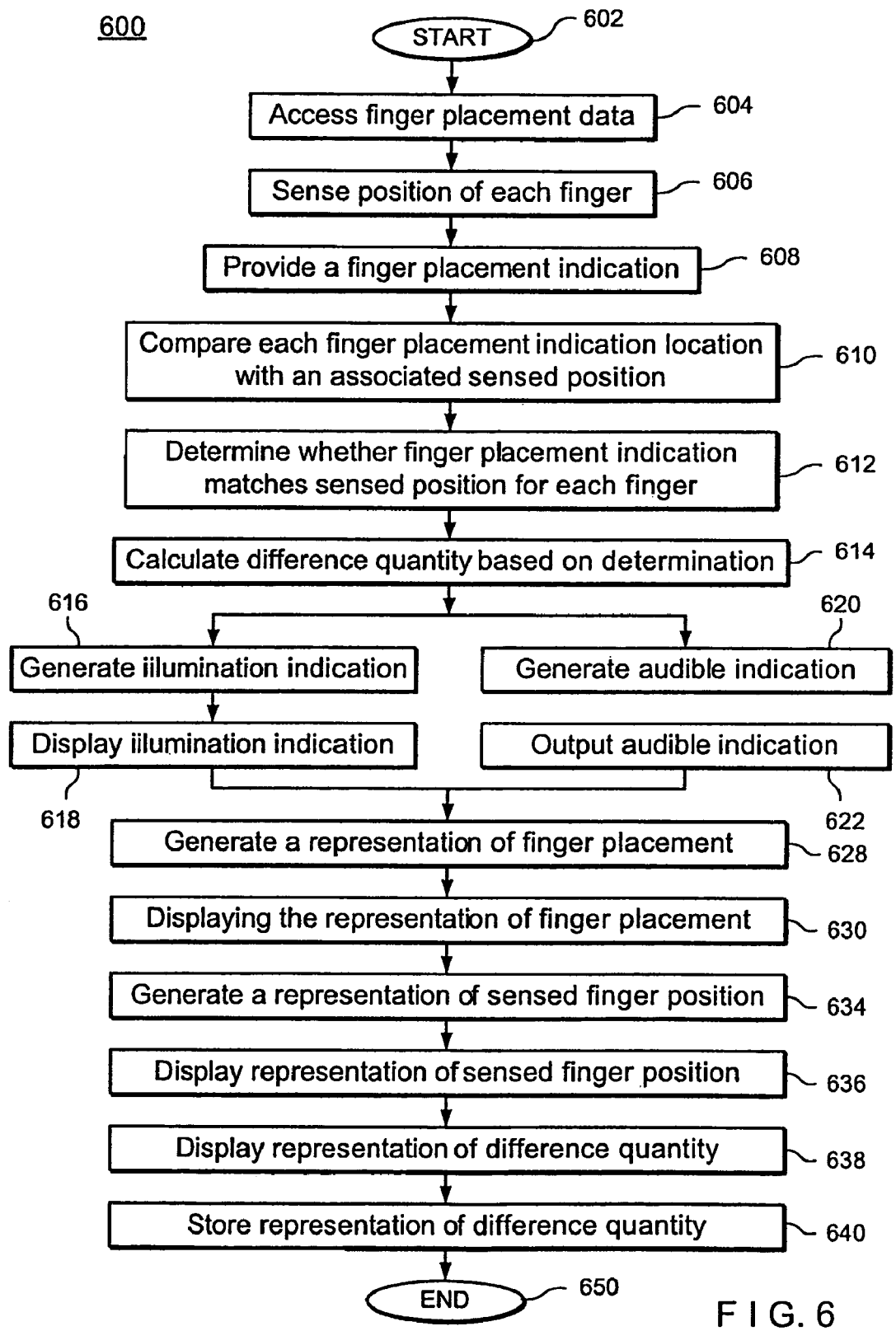
FIG. 6 shows a flowchart of steps to implement an embodiment of the present invention.

FIG. 6 shows a flowchart of steps 600 to implement an embodiment of the present invention. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, or other non-volatile memory. The program code stored on an electronic memory medium is a structural element. The process 600 begins with start step 602. Finger placement data is accessed, as shown in step 604. The finger placement data is typically stored on an electronic medium and represents recorded, or digitally generated representations of proper hand placement on an instrument to create selected chords, music notes or proper hand placement on an object, such as a golf club, tennis racquet or other equipment.

The position of a finger or hand is sensed as shown in step 606. This may be achieved by one or more sensors disposed on the facsimile of an object (guitar strings, golf club, tennis racquet) to sense, via pressure, where a user's fingers and/or hands are located on the object. A finger placement indication is provided, as shown in step 608. This is typically an indication, such as a light, visible on a touch screen that indicates where a user's fingers should be to correspond to the proper location. A comparison is made of each sensed finger position (where the user's fingers actually are) and the finger placement indication location (the proper location for the user's fingers) (610) to determine whether the sensed finger placement on the object matches the proper finger placement (612).

A difference quantity is calculated as shown in step 614. This difference quantity represents the difference between the proper location of the user's fingers and the sensed location of the user's fingers. If the difference quantity is less than a predetermined threshold the sensed position will be deemed equal to the proper location.

An illumination indication may be generated (616) and displayed (618). Also an audible indication may be generated (620) and displayed (622). Step 628 shows that the representation of finger placement may be generated and displayed (630). This represents where the user's fingers should be to properly play the particular piece.

Step 634 shows that a representation of sensed finger placement may be generated and displayed (636). This represents where the user's fingers are on the facsimile object. The difference quantity may be displayed (638) as well as stored (640). Thus, as a user repeats a piece the user will be able to have a visual indication of improvement because the difference quantity should become smaller. Step 650 shows the process ends.

Figure 7:
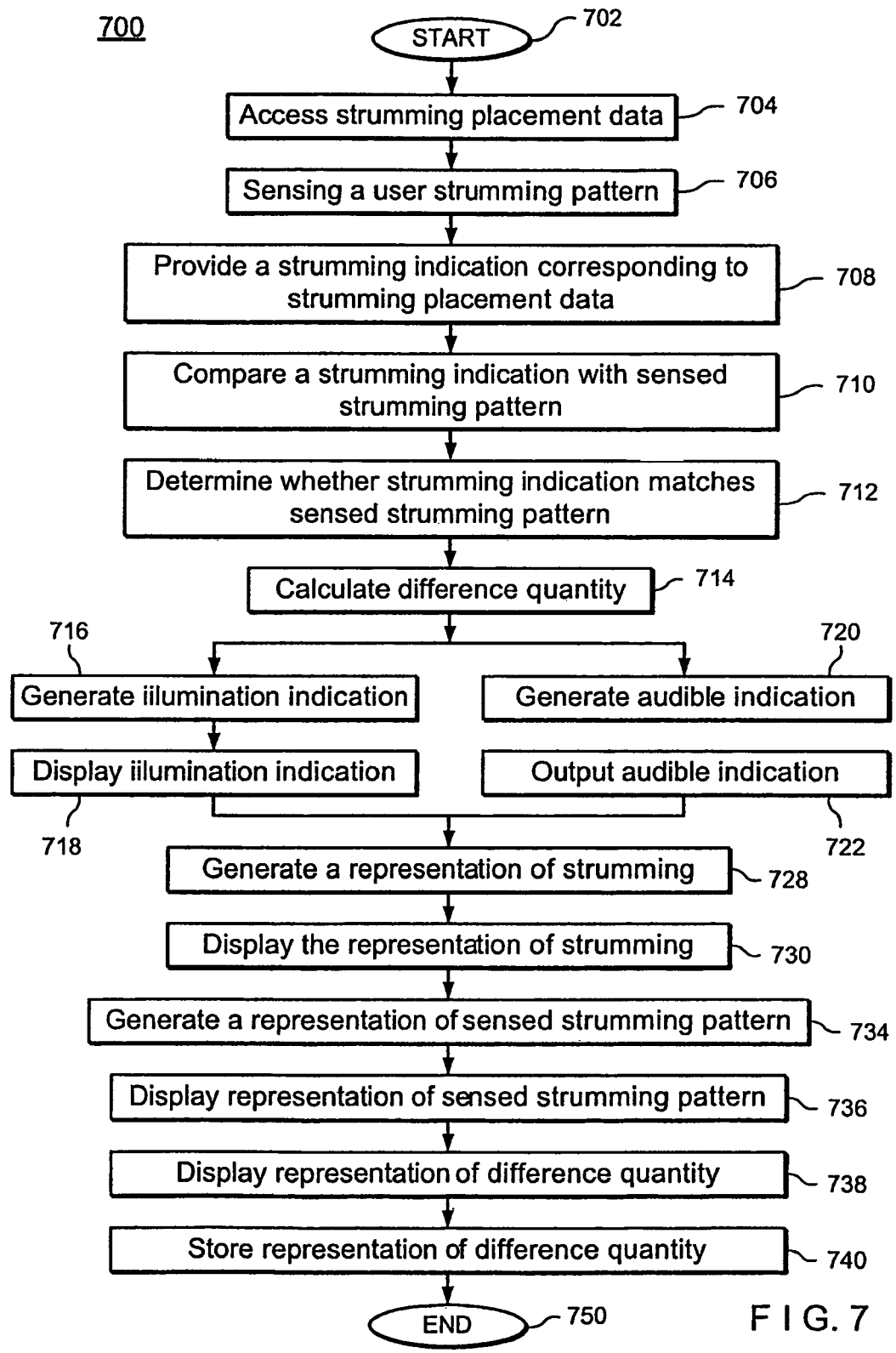
FIG. 7 shows a flowchart of steps to implement another embodiment of the present invention.

FIG. 7 shows a flowchart of steps 700 to implement another embodiment of the present invention. FIG. 7 is similar to FIG. 6; but instead of sensing finger placement data, strumming data is sensed. The steps 700 may be executed by a processor, or otherwise executed to perform the identified functions and may also be stored in one or more memories. For example, the steps of FIG. 7 may be stored on a computer-readable medium, such as ROM, RAM, EEPROM, CD, DVD, or other non-volatile memory. The program code stored on an electronic memory medium is a structural element. The process 700 begins with start step 702. Strumming placement data is accessed, as shown in step 704. The strumming data is typically stored on an electronic medium and represents recorded or digitally generated representation of proper strumming technique to create selected chords.

A strumming pattern is sensed as shown in step 706. This may be achieved by one or more sensors disposed on the facsimile of a guitar, as described herein, to sense, via pressure, how a user is strumming on the guitar facsimile. A strumming indication is provided, as shown in step 708. This is typically an indication, such as a light; visible on a touch screen at a location of a string representation that indicates how a user should strum the strings of a guitar to correspond to the proper technique.

A comparison is made of the sensed strumming technique (how the user is strumming) and the strumming pattern (the proper strumming technique) (710) to determine whether the sensed strumming technique on the string representations matches the proper strumming technique (712).

A difference quantity is calculated as shown in step 714. This difference quantity represents a difference between the proper strumming technique of a user and the sensed strumming technique. If the difference quantity is less than a predetermined threshold the sensed strumming position will be deemed equal to the proper location.

An illumination indication may be generated (716) and displayed (718). Also an audible indication may be generated (720) and displayed (722). Step 728 shows that a representation of strumming may be generated and displayed (730). This represents proper strumming technique of a user to properly play the particular piece.

Step 734 shows that a representation of sensed strumming technique may be generated and displayed (736). This represents where a user's hands are on the facsimile object. The difference quantity may be displayed (738) as well as stored (740). Thus as a user repeats a piece they will be able to have a visual indication of their improvement because the difference quantity should become smaller. Step 750 shows the process ends.

Figure 8:
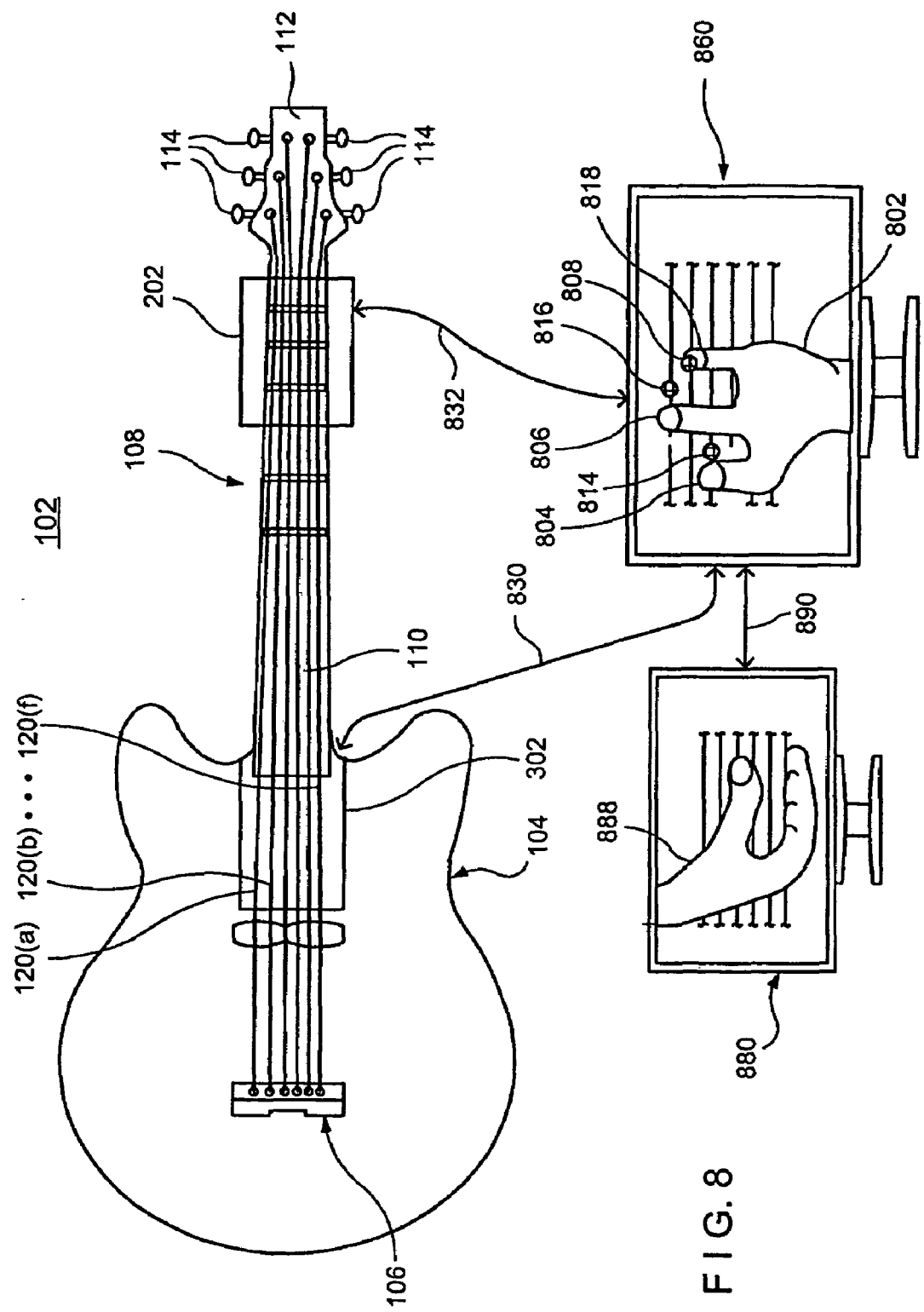
FIG. 8 shows an embodiment of the present invention in which a facsimile of a musical instrument is operatively coupled to multiple display devices.

FIG. 8 shows an embodiment of the present invention in which the facsimile of a musical instrument 102 is operatively coupled to multiple display devices 860, 880. The facsimile of the musical instruments and related components have been described previously herein. FIG. 8 specifically shows that the finger placement apparatus 202 and strumming apparatus 302 are operatively coupled to display units 860 and 880 via bidirectional communication media 832 and 830, respectively. The media 830, 832 are typically a bus or wired connection or wireless connection, such as WiFi. The display units 860 and 880 are used to display the image data generated by the apparatus 202 and 302. For example, display unit 860 may display output from apparatus 202, which may include placement indicators 814, 816 and 818 as well as sensed finger locations 804, 806 and 818 (finger location 818 is directly on placement location 818) of hand representation 802.

Display unit 888 may display output from apparatus 302 that includes thumb representation 888 relative to string representations. The display units 860, 880 may be, for example, a monitor, LCD (liquid crystal display), a plasma screen, a graphical user interface (GUI) or other module adapted to display output data typically by a representation of pixels. Display units 860 and 880 are interconnected by interconnection medium 890, which may be a wireless connection or wired connection such as a bus or suitable cable. The display units 860, 880 may be coupled to another CPU (not shown), processor (not shown), or computer (not shown), such as a desktop computer, which can provide further storage and/or processing functionality.

FIG. 9 shows a block diagram of a processing module that may be used with the present invention. The processing module includes sensor module 260 and CPU module 270. The sensor module 260 is used to sense pressure of a user's hand and/or fingers and provide the sensed data to CPU module 270.

CPU module 270 includes a control module 910 storage module 920 and algorithm storage module 655. CPU module 270 is operatively coupled to display unit 950 and speaker 940, via interconnection media 948 and 938, respectively.

The control module 910 provides processing functionality and is in bidirectional communication with sensor module 260 and storage module 920 to retrieve process and transmit data. The control module 910 is typically a processor that includes an arithmetic logic unit (ALU), which performs arithmetic and logical operations, and a control unit (CU), which extracts instructions from memory and decodes and executes them, utilizing the ALU when necessary. An I/O interface is used to operatively couple the components of CPU module 270.

The control module 910 may also be connected to a network to retrieve data, via connection medium 970, which may be a bus, wireless connection or DSL cable. This network, such as the Internet, Ethernet, or other network of operatively coupled computers, processors, or output devices can be a source of placement data.

An example of a wired network is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers.

Storage module 920 and algorithm module 655 (including algorithm module 600 and algorithm module 700 are electronic storage media that can store data used by system CPU module 270. The memory modules 920 and 655 may include, for example, RAM, ROM, EEPROM or other memory media, such as an optical disk, or a removable cartridge, on which digital information is stored in the form of bits. Alternatively, the electronic storage functionality may be performed by a remote memory coupled to CPU module 270 via wired or wireless bi-directional communication medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for self-instruction, comprising:
    accessing finger placement data corresponding to a sequence of predetermined finger placements on a plurality of objects;
    sensing a position for each finger of one or more fingers on one or more object representations;
    providing a finger placement indication on the one or more object representations, the finger placement indication corresponding to each finger of the one or more fingers, based on the finger placement data,
    wherein the sensing and the providing steps utilize a same screen;
    comparing each finger placement indication location with an associated sensed position for each finger; and
    determining whether the finger placement indication matches the sensed position for each finger.

2. The method according to claim 1, further comprising:
    generating an illumination indication corresponding to the finger placement indication; and
    displaying the illumination indication.

3. The method according to claim 1, further comprising:
    generating an audible indication corresponding to the sensed finger position; and
    outputting the audible indication.

4. The method as claimed in claim 1, further comprising:
    generating a representation of the finger placement data; and
    displaying the representation of the finger placement data on a display unit.

5. The method as claimed in claim 4, further comprising:
    generating a representation of the sensed finger position; and
    displaying the representation of the sensed finger position on the display unit.

6. The method as claimed in claim 1, wherein the objects include strings.

7. A method for self-instruction, comprising:
    accessing strumming placement data corresponding to a pattern of predetermined strumming on a plurality of strings;
    sensing a user strumming pattern for a user as a user strums one or more string representations;
    providing a strumming indication corresponding to the strumming placement data,
    wherein the sensing and the providing steps utilize a same screen;
    comparing the strumming indication with an associated sensed strumming pattern; and
    determining whether the strumming indication matches the sensed strumming pattern.

8. A method comprising:
    accessing finger placement data corresponding to a sequence of predetermined finger placements on a plurality of strings;
    accessing strumming placement data corresponding to a pattern of predetermined strumming on a plurality of strings;
    sensing a position for each finger of one or more fingers on one or more string representations;
    providing a finger placement indication on the one or more string representations, the finger placement indication corresponding to each finger of the one or more fingers, based on the finger placement data,
    wherein the sensing and the providing steps utilize a same screen;
    sensing a user strumming pattern for a user as a user strums one or more second string representations;
    providing a strumming indication corresponding to the strumming placement data;
    comparing the strumming indication with an associated sensed strumming pattern;
    determining whether the strumming indication matches the sensed strumming pattern;
    comparing each finger placement indication location with an associated sensed position for each finger; and
    determining whether the finger placement indication matches the sensed position for each finger.

9. An apparatus for self-instruction, comprising:
    a storage unit for storing accessible finger placement data corresponding to a sequence of predetermined finger placements on a plurality of strings;
    a touch-sensitive display unit for displaying string representations and indications of said predetermined finger placements, and for sensing a position for each finger of one or more fingers on one or more string representations,
    wherein the sensing and the providing utilize a same screen; and
    a processor unit for providing a finger placement indication on the touch-sensitive display unit, corresponding to each finger of the one or more fingers, based on the finger placement data,
    wherein the processor unit compares each finger placement indication location with an associated sensed position for each finger and determines whether the finger placement indication matches the sensed position for each finger.

10. An apparatus comprising:
    a storage unit for storing accessible strumming placement data corresponding to a pattern of predetermined strumming on a plurality of strings;
    a touch sensitive display unit for displaying string representations and indications of the predetermined strumming, and for sensing a user strumming pattern for a user as a user strums one or more string representations;
    a processor unit for providing a strumming indication corresponding to the strumming placement data;
    a comparison unit for comparing the strumming indication with an associated sensed strumming pattern,
    wherein the sensing and the providing steps utilize a same screen; and
    a determination unit for determining whether the strumming indication matches the sensed strumming pattern.

11. A program embodied in a computer-readable medium to control a processor to implement a method, the method comprising the steps of:

accessing finger placement data corresponding to a sequence of predetermined finger placements on a plurality of objects;

sensing a position for each finger of one or more fingers on one or more object representations;

providing a finger placement indication on the one or more object representations, the finger placement indication corresponding to each finger of the one or more fingers, based on the finger placement data, wherein the sensing and the providing steps utilize a same screen;

comparing each finger placement indication location with an associated sensed position for each finger; and determining whether the finger placement indication matches the sensed position for each finger.

* * * * *